THERMIONIC DIODE CONVERTER SYSTEM

Original Filed Sept. 14, 1962 2 Sheets-Sheet 1

INVENTOR.
NED S. RASOR
BY
ATTORNEY

THERMIONIC DIODE CONVERTER SYSTEM

Original Filed Sept. 14, 1962 2 Sheets-Sheet 2

INVENTOR.
NED S. RASOR

BY

ATTORNEY

United States Patent Office

Re. 25,944
Reissued Dec. 14, 1965

25,944

THERMIONIC DIODE CONVERTER SYSTEM

Ned S. Rasor, Lexington, Mass., by North American Aviation, Inc., assignee, El Segundo, Calif.

Original No. 3,146,388, dated Aug. 25, 1964, Ser. No. 223,695, Sept. 14, 1962. Application for reissue June 11, 1965, Ser. No. 464,896
13 Claims. (Cl. 318—138)

Matter enclosed in heavy brackets [ ] appears in the original patent but forms no part of this reissue specification; matter printed in italics indicates the additions made by reissue.

The present invention is directed to energy conversion systems and more particularly to push-pull triggered thermionic diode converter systems.

The outputs of thermionic diodes utilized for the conversion of heat to electrical energy are typical between about 0.3 and 1.0 volt D.C. at high currents, i.e., the order of hundreds of amperes. Most applications of such converters require an efficient means to increase the voltage output of such devices, since hundreds of diodes would be required if only series operation were used to obtain 110 volts for example. Further, a single large diode is much more efficient than many small diodes and costs much less to manufacture. While inversion of thermionic diode output to A.C. and its subsequent transformation to high voltage is attractive in principle, such conventional methods are highly inefficient. This is apparent when it is considered that conventional mechanical switching techniques are not only difficult but highly inefficient at the high current outputs of thermionic diodes. Conventional electronic switching is similarly inefficient at low voltages. It is the primary purpose of this invention to provide an improved method and apparatus for converting the high current D.C. output of thermionic diodes to A.C. or mechanical energy by utilizing the bistable nature of the plasma thermionic converter diode itself to interrupt the current without the use of electronic components in the primary circuit of the voltage transformer.

An object of the present invention is to provide a method and apparatus for transforming the high current, low voltage output of a thermionic diode converter to any desired voltage-current combinations or mechanical power without external switching at high currents.

Another object of the present invention is to provide a method and apparatus for alternately switching a pair of thermionic diodes from an ignited mode to an extinguished mode of operation to provide push-pull operation.

A further object of the present invention is to provide a method and apparatus for alternately connecting a pair of thermionic diodes across a load by pulsing the diodes so as to change the mode of operation of each of the diodes.

A still further object of the present invention is to provide a method and apparatus for converting thermal energy to A.C. electrical energy.

Another object of the present invention is to provide a method and apparatus for converting thermal energy directly to mechanical energy.

These and other objects and advantages of the present invention will be more apparent from the following description and the appended drawings, made a part hereof, in which:

FIGS. 1(a) and 1(b) show the output characteristics of the thermionic converter utilized in the present invention;

Figure 1A:
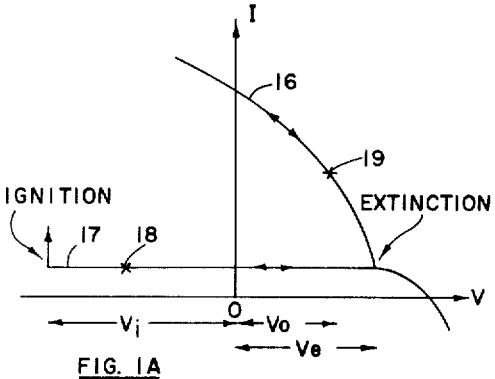

Referring now to the drawings in detail, the cesium vapor thermionic converter diode preferably utilized in the present invention [see U.S. Patent 2,980,819 and Kaye and Welsh, Direct Conversion of Heat to Electricity (John Wiley & Sons, 1960), chapters 6–11] has the output characteristics as shown in FIG. 1. There is a region of output voltages in which there are two stable modes of reversible operation. Irreversible transition from the high current or "ignited" mode, curve 16, to the low current or extinguished mode, curve 17, occurs when the output voltage V exceeds a critical value designated the extinction voltage $V_e$. Similarly, a transition from the extinguished to the ignited mode occurs when the output falls belows the ignition voltage $V_i$. The values of the extinction and ignition voltages depend upon the converter diode parameters such as spacing, temperature, and cesium pressure. To operate in the present invention these parameters must be adjusted, in any manner well known in the art, so that $$|V_i| \geqq |V_e|$$

Figure 1B:
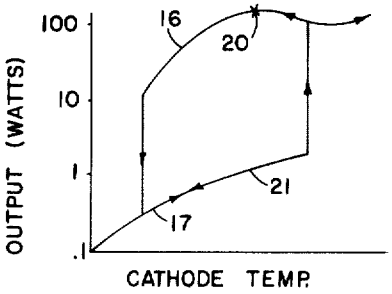

This characteristic two-made operation is also shown in FIG. 1(b), where the diode output is plotted as a function of cathode temperature. The optimum operating points for the extinguished and ignited modes are indicated as points 18 and 19 in FIG. 1(a) and 20 and 21 in FIG. 1(b).

Figure 2:
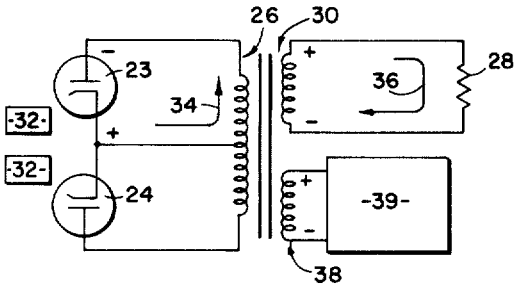
FIG. 2 shows the circuit of the present invention during one mode of operation.
Figure 3:
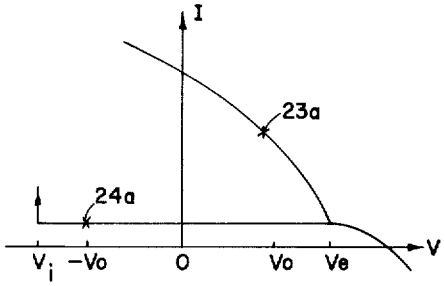
FIG. 3 shows the characteristics of the operation of FIG. 2.
Figure 4:
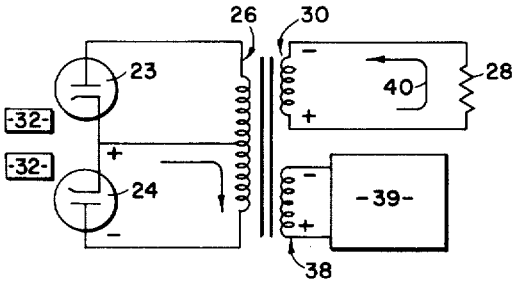
FIG. 4 shows the circuit of the present invention during another mode of operation.
Figure 5:
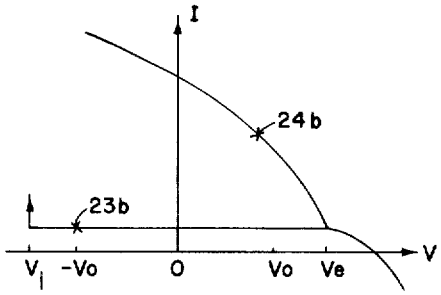
FIG. 5 shows the characteristics of the operation of FIG. 4.
Figure 6:
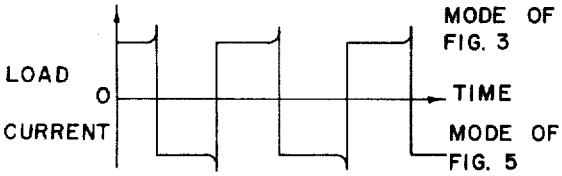
FIG. 6 shows the load current wave form obtained by the present invention.

FIG. 2 shows the arrangement of the present invention, which includes two thermionic converters 23 and 24 connected in push-pull across a center-tapped transformer primary winding 26. The resistance 28 across the secondary windings 30 and the turns ratio are chosen to reflect the optimum load impedance for the converter into the primary winding 26. Considering the circuit where the converter 23 is in the ignited mode and the converter 24 is in the extinguished mode (see FIG. 3 for the respective operating points 23a and 24a), the current flow in the primary circuit, assuming the application of heat from a source diagrammatically indicated as 32, which may be a single source or multiple sources, will be in the direction of arrow 34. The output current from 23 at a voltage $V_o$ induces a clockwise current 36 in the secondary 30 and biases diode 24 to $-V_o$. Prior to core saturation a pulse (i.e. inducing a fraction to several volts in the primary depending upon diode characteristics) is supplied by pulse circuit 39 to the auxiliary winding 38 which drives the voltage of 23 more positively past $V_e$ (see FIG. 3) and drives the voltage of 24 more negatively past $V_i$. The pulse therefore extinguishes 23 and ignites 24 to give the new stable operating point shown in FIG. 5. FIG 4 shows the operation of the circuit under the conditions that diode 23 is extingiushed, point 23b, and diode 24 is ignited, point 24b, so that a counter-clockwise current 40 is induced in the secondary circuit 30 and diode 23 is biased to $-V_o$. Similarly, if the next pulse from 39 is in the opposite direction, the circuit will revert to the state shown in FIGS. 2 and 3. Thus, high voltage alternating current of the form shown in FIG. 6 is generated in the resistor 28 at a frequency determined by the rate at which the auxiliary winding 38 is pulsed in alternate directions by circuit 39. For the purposes of this description, the secondary winding 30 and the ultimate load indicated by resistor 28 as well as the auxiliary winding 38 and its associated pulse circuit 39 are collectively referred to herein as the load means coupled to the primary winding 26.

Figure 7:
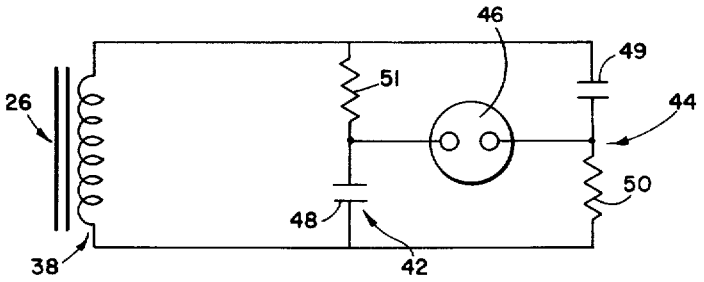
FIG. 7 shows examples of pulse circuits for use in the present invention.

The voltage induced across the auxiliary winding 38 by the converter can be made arbitrarily high by the selection of a high turn ratio. Thus, conventional electronic components can be used to operate the pulse circuit 39 and any known pulse circuit could be utilized. One example of a pulse circuit of simple construction which may be utilized is shown in FIG. 7. A pair of series-connected RC networks 42 and 44 is connected in parallel with the auxiliary winding 38 and has a trigger element 46 so connected that both the resistive elements and capacitors are in series with the trigger element and the auxiliary winding 38. The trigger element does not conduct until a critical breakdown voltage is reached, and then conducts at a voltage much less than the critical value. A simple glow tube or a solid state gated rectifier could be used. Thus, during the mode of operation shown in FIGS. 2 and 3, the capacitors 48 and 49 are charged in parallel at a rate determined by the value of resistors 50 and 51. When the voltage across the capacitors 48 and 49, and thus across the trigger element 46, exceeds the breakdown voltage of 46, the capacitors 48 and 49 discharge in series applying a pulse to the auxiliary winding 38 approximately double the induced voltage and in the same direction. On the reverse part of the cycle, i.e., the mode of operation shown in FIGS. 4 and 5, the same sequence would occur in the alternate direction. The frequency of the pulses would be determined by the value of RC and the breakdown voltage, as is well known in the art. An initial pulse would be required to start the oscillation. If desirable, any number of capacitor resistors and triggering elements may be utilized.

The size of the capacitors 48 and 49 and the voltage to which they are charged depend upon the amount of energy storage necessary. This, in turn, depends upon the magnitude of the pulse and its required duration. The pulse must induce an E.M.F. greater than $V_e - V_o$ in the ignited converter diode to extinguish it. Furthermore, the equation $$|V_1| \geqq |V_e|$$

must be satisfied or the current from the igniting converter diode will prevent extinguishing the other converter diode. Therefore, the pulse must induce an E.M.F. greater than $V_1 - V_o$ in the primary winding 26 to flip the circuit. Since this is about the same as $V_o$, and is reflected across the resistor 28, the instantaneous power during the pulse is approximately equal to the output power. The time required for extinction once $V_e$ is exceeded is inversely proportional to the spacing of the electrodes of the thermionic diode, and is about one microsecond for a spacing of one millimeter. Thus, at a frequency of alternation of about 1 kilocycle per second the pulse power must be of the order of $10^{-3}$ the output power for one millimeter spacing, and would be correspondingly less at lower frequencies and smaller spacings.

It is apparent from the above-described embodiment that thermal energy may be converted directly to an A.C. output voltage without utilizing high current carrying capacity or low voltage switching means.

Figure 8:
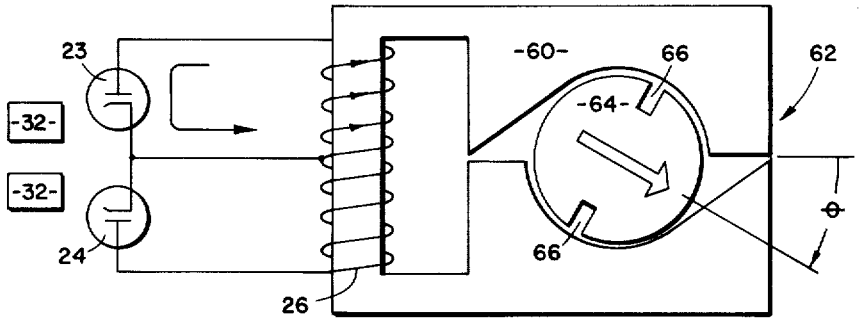
FIG. 8 shows a second embodiment of the present invention utilizing an induction motor.
Figure 9:
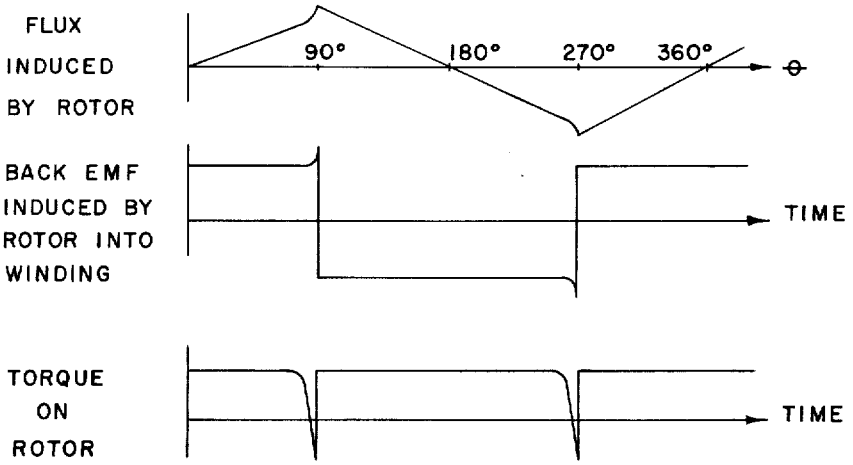
FIG. 9 shows the operating cycle of the embodiment of FIG. 8.

The conversion of thermal energy to mechanical power through the use of the thermionic converter system of the present invention is shown in FIGS. 8 and 9. The conversion of high current D.C. to mechanical energy ordinarily requires the use of direct current motors which have high resistive losses in the brushes. Homopolar motors, while also feasible, require the use of mercury brushes and very high r.p.m. at low torque. The embodiment shown in FIGS. 8 and 9 eliminates these disadvantages and further provides for the elimination of some of the power losses in the transformer of the previously described embodiment of FIGS. 2–7. The present embodiment utilizes the thermal energy converter diodes 23 and 24 in push-pull arrangement, as previously described. However, no secondary or auxiliary windings are used. The core of the transformer is now used as the stator 60 of a motor generally indicated at 62. A permanent magnet 64 is used as the rotor in the magnetic circuit. A rectified induction magnet, known in the art of induction motors, could also be used. For simplicity of explanation, only a two-pole motor 62 is described, but multiple-pole configurations are within the purview of the present invention.

The rotor 64 and stator 60 are shaped in such a way that the flux induced in the magnetic circuit by the rotor 64 is generally a linear "sawtooth" function of rotation as shown in FIG. 9. The rotor 64 is slotted, as at 66, so that an abrupt increase in flux occurs as the permanent magnetic axis, $\theta$, of the rotor approaches the flux axis of the stator (at $\theta = 90°$ or $270°$). The E.M.F. induced in the primary winding by the rotor 64 at constant speed (see FIG. 9) is the same as that induced by the pulse circuit 39 in the embodiments of FIGS. 2–5. The rotor 64 is driven alternately by the coverter diodes 23 and 24 as follows: As in FIG. 2, converter diode 23 is ignited and converter diode 24 is extinguished. The flux induced by the output current of 23 produces a torque on the rotor 64 in the direction shown as positive $\theta$ in FIG. 8. As the rotor turns, the induced E.M.F. from the resulting flux change in the windings is equal to $V_o$ and $-V_o$ for diodes 23 and 24, respectively. When the rotor 64 approaches magnetic alignment ($\theta = 90°$), the abrupt flux increase due to the slots 66 induces a voltage pulse in the winding 26 which flips the converters 23 or 24 as did the pulse from pulse circuit 39 in the first embodiment. This cycle is then repeated in the next half turn of the rotor 64 in which diode 24 is ignited and diode 23 is in the extinguished mode. In this embodiment the load means also includes a means for controlling or switching the mode of operation of thermal energy converting diodes, whereas in the first embodiment separate circuits were provided in the load for accomplishing the switching and controlling. It is apparent that a starting pulse or rotation of rotor 64 is necessary to start the motor and the sequential voltage generation from diodes 23 and 24. The rotor arrangement of this embodiment could be utilized as a free rotor and employed in the transformer of the first embodiment in place of the pulse generator circuit 39, if desired.

Although particular embodiments of the present invention have been described, various modifications will be apparent to those skilled in the art. Therefore, the present invention is not limited to the specific embodiments disclosed, but only by the appended claims.

What is claimed is:

1. Apparatus for directly converting thermal energy to alternating current comprising a pair of thermal energy converter diodes connected in a push-pull circuit relationship adapted to generate D.C. voltages of opposite polarity upon the application of thermal energy, said circuit having an output, each of said diodes having a first and second mode of operation, and means inductively connected to said push-pull circuit for alternately controlling the mode of operation of said diodes so that an alternating current is generated at said output.

2. Apparatus for directly converting thermal energy to alternating current comprising a pair of thermal energy converter diodes connected in a push-pull circuit relationship, each of said diodes having a first mode of operation providing an output voltage of a first polarity and a second mode of operation providing an output voltage of a polarity opposite to said first polarity, said circuit having an output, and means inductively coupled to said output for controlling the mode of operation of said diodes so that one of said diodes is operating in one mode while the other of said diodes is operating in another mode.

3. Apparatus for directly converting thermal energy to alternating current comprising a pair of thermal energy converter diodes connected in a push-pull circuit arrangement having its output connected across a transformer primary, each of said diodes having a first mode of operation providing a D.C. voltage output of a first polarity and a second mode of operation providing a D.C. voltage of an opposite polarity, and means inductively coupled to said primary of said push-pull circuit for applying an electrical pulse to said primary to switch the mode of operation of said diodes so that the direct current output of each of said diodes is alternately applied to the output of said circuit.

4. The apparatus of claim 3 wherein said means for applying an electrical pulse includes a pulse means connected to the secondary of said transformer and energized by said D.C. voltage output.

5. The apparatus of claim 3 wherein said last-named means includes a stator inductively coupled to said primary and a slotted rotatable shaft operatively coupled to said stator.

6. The apparatus of claim 3 wherein said last-named means includes means for generating an electrical pulse, said means for generating said pulse being energized by the output of said circuit.

7. The apparatus of claim 3 wherein said last-named means includes an induction motor means coupled to said primary, said induction motor means including means for periodically inducing an electrical pulse in said primary.

8. The apparatus of claim 3 wherein said last-named means includes an induction motor means coupled to said primary, said motor means including a permanent magnet rotor having at least one slot.

9. The apparatus of claim 3 wherein said transformer includes a pair of secondary windings, one of said secondary windings being connected to a means for generating said electrical pulse, the other of said windings being connected to a load.

10. Apparatus for directly converting thermal energy to alternating current comprising a pair of thermal energy converter diodes each having an electrode adapted to emit electrons upon the application of heat and a collector electrode, each of said diodes having a first and second mode of operation, one of said modes providing a first voltage output and the other of said modes providing a second voltage output, means connecting each of said collector electrodes to one end of a center-tapped transformer, means connecting both of said emitter electrodes to said center tap, and means inductively coupled to said transformer for controlling the mode of operation of said diodes to sequentially and alternately change the mode of operation of each of said diodes.

11. The apparatus of claim 10 wherein said last-named means includes electrical pulse generating means connected to a secondary winding of said transformer.

12. The apparatus of claim 10 wherein said last-named means includes a secondary winding in said transformer, said secondary being connected to means for converting said alternating current to rotational energy, said means for converting to rotational energy including electrical pulse generating means.

13. Apparatus for directly converting thermal energy to a different form comprising a pair of thermal energy converter diodes connected in push-pull arrangement, each of said diodes having a first mode of operation providing a voltage output of a first polarity and a second mode of operation providing a voltage output having a polarity opposite to said first polarity, and load means *inductively* coupled to said push-pull arrangement, said load means including means for switching the mode of operation of said diodes so that the direct current output of each of said diodes is alternately applied to said load means.

No references cited.

MILTON O. HIRSHFIELD, *Primary Examiner.*

ORIS L. RADER, *Examiner.*

S. GORDON, C. E. ROHRER, *Assistant Examiners.*